May 13, 1941. E. C. SCHMID 2,241,740
CASING AND GRID STRUCTURE
Filed May 29, 1940
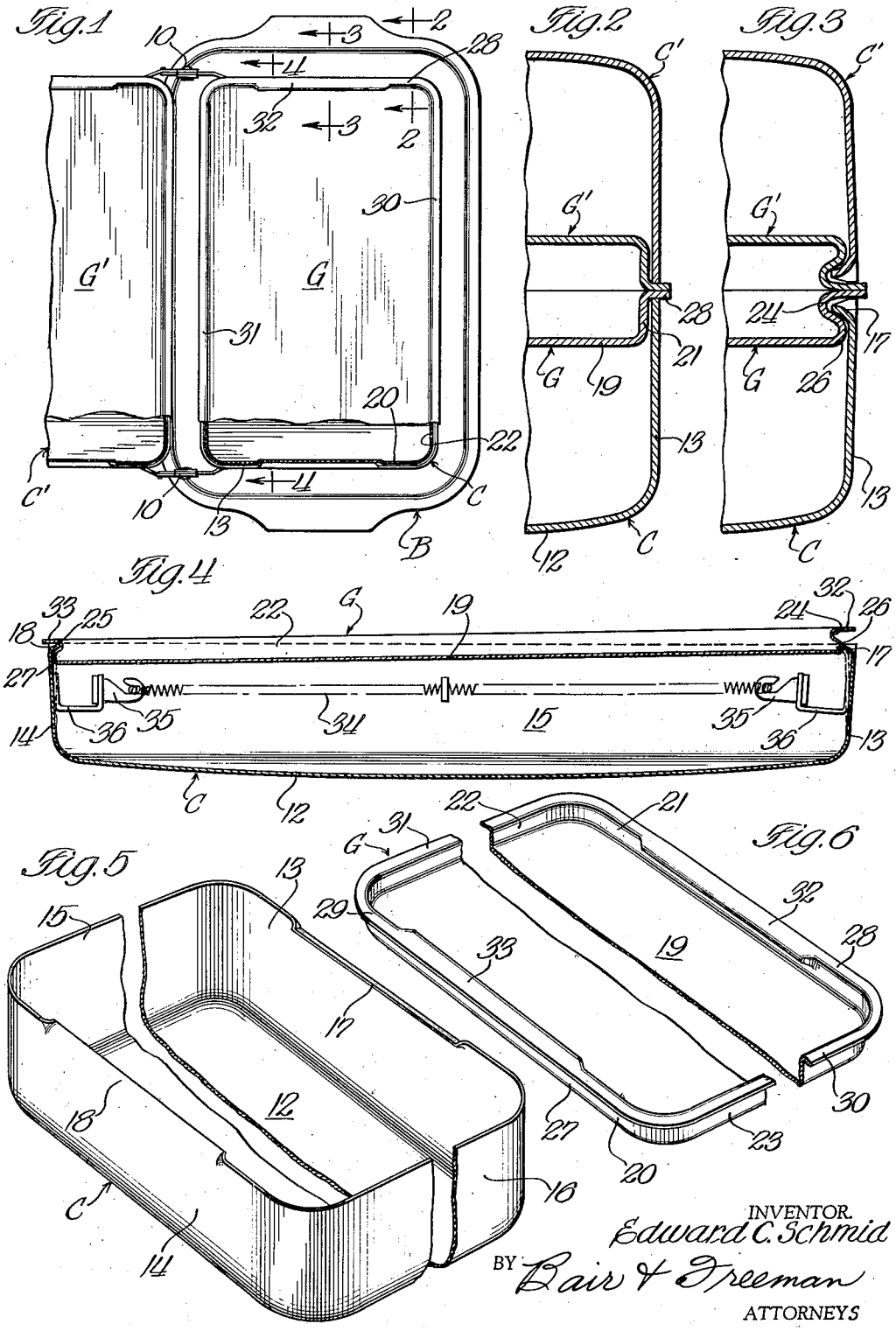
INVENTOR.
Edward C. Schmid
BY Bair & Freeman
ATTORNEYS Patented May 13, 1941

2,241,740

UNITED STATES PATENT OFFICE 2,241,740

CASING AND GRID STRUCTURE

Edward C. Schmid, St. Louis, Mo., assignor to Knapp-Monarch Company, St. Louis, Mo., a corporation of Missouri Application May 29, 1940, Serial No. 337,800

2 Claims. (Cl. 53—5)

My invention relates to a casing and grid structure particularly designed for electrical appliances wherein heating elements are located within the casing for heating the grid.

An important object of my invention is to provide a simple, durable and inexpensive arrangement for securing the grid in position relative to the casing without the use of bolts, rivets, tongues that are bent subsequent to assembly or other fastening elements, the grid and casing being so formed that certain parts cooperate with each other to permit snapping of the grid into position, after which the grid is retained in the desired position and under sufficient tension to prevent any dislocation of the grid relative to the casing even when the forces of expansion and contraction caused by heating and cooling of the casing and grid structure are encountered.

Another object of my invention is to provide a pan-like casing with a grid that is slightly countersunk therein and a means to hold the grid in the casing which consists of opposite Z-shaped portions of the grid cooperating with inturned flanges of the casing, the Z-shaped portions snapping past the inturned flanges during assembly and the inturned flanges thereafter coacting with the central legs of the Z-shaped portions to urge the grid toward contact of a stop flange thereof with the peripheral edge of the casing.

Still another object is to provide a casing and grid structure that eliminates the necessity of fastening means and is adaptable for relatively light and inexpensive electric appliances, the grid and casing being made of sheet metal.

With these and other objects in vew, my invention consists in the construction, arrangement and combination of the various parts of my device whereby the objects contemplated are attained, as hereinafter more fully set forth, pointed out in my claims and illustrated in the accompanying drawing, wherein:

Figure 1 is a plan view of an electrical appliance such as a sandwich toaster showing the toaster open and my casing and grid structure embodied in the construction of the toaster, certain portions of the grids being broken away and a portion of one of the grids being shown in section to illustrate the coaction of the various parts of the casing and grid with each other;

Figure 2 is an enlarged sectional view on the line 2—2 of Figure 1 showing the toaster closed;

Figure 3 is an enlarged sectional view on the line 3—3 of Figure 1 showing the toaster closed;

Figure 4 is a sectional view as on the line 4—4 of Figure 1 showing only the lower casing and grid with the grid in one position it assumes during assembly, and Figures 5 and 6 are perspective views of the casing and grid respectively, showing particularly the ends with the center portions cut away to conserve space on the drawing.

In Figure 1, I have illustrated a base B, lower and upper casings C and C' and lower and upper grids G and G'. The casing C may be suitably supported in any desired manner on the base B and the casing C' hinged thereto as by hinges 10. The casings C and C' are substantially similar in construction and likewise the grids G and G' are similar in construction. Accordingly I will describe only the casing C and the grid G throughout the remaining portion of my specification.

The casing C has a main wall 12, and walls 13 and 14 outstanding therefrom and side walls 15 and 16 also outstanding therefrom. The end walls 13 and 14 are provided at their terminal edges with inturned flanges 17 and 18 respectively. The flanges 17 and 18 extend throughout the major length of the end walls 13 and 14.

The grid G has a substantially flat main wall 19, a peripheral flange having end portions 20 and 21 and side portions 22 and 23. The end portions 20 and 21 have for a portion of their length a Z-shaped cross-section forming elongated pockets indicated at 24 and 25 respectively, and projecting portions 26 and 27.

The edges of the peripheral flange 20—21—22—23 are provided with an outstanding stop flange 28—29—30—31. The stop flange is widened as indicated at 32 and 33 adjacent the pocketlike depressions 24 and 25, so that the bottoms of the depressions are closer together than the distance between the end walls 13 and 14 of the casing C. This permits the pocketlike depressions to accommodate the inturned flanges 17 and 18, the elevation of which is slightly below the upper edge of the casing C.

The casing C may enclose the usual arrangement of heat-element 34 supported by insulators 35 and brackets 36. The grid G is assembled relative to the casing C merely by placing one end in position, as in Figure 4 (left side), and then forcing the projection 26 past the inturned flange 17 at the right side of the figure. Dotted lines illustrate the initial position of the end walls 13 and 14 which must spring out to the full line position to permit the projecting portion 26 of the Z-shaped cross section of the grid to snap into position. Finally the grid will assume the position shown in Figure 3 with the inturned flange 17 bearing against the angular intermediate wall of the Z-shaped part of the grid, thereby tending to pull the stop flanges 28—29—30—31 into tight engagement with the upper edge of the casing walls 13—14—15—16. This operation results from the flanges 17 and 18 being slightly less in elevation than the upper edge of the casing.

The resiliency of the sheet metal insures that the grid will remain in position after it is once assembled relative to the casing under normal operating conditions. The grid can, however, be removed by inserting a suitable tool, such as a screwdriver, under the flange 32 or 33 and prying the grid out of position. The grid can then again be snapped back into position without the necessity of utilizing any screws or other fastening means. My structure is particularly adapted for grids and casings made of sheet metal, the casing particularly entering into the operation of effecting snapping of the grid into position and subsequent retention of the grid relative to the casing due to the coaction between the inturned flanges 17 and 18 and the pocket-like depressions 24 and 25.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a casing and grid structure for electrical appliances, a casing formed of sheet metal and having a main wall and side and end walls extending from the edges of said main wall at substantially right angles thereto, a grid having a main wall, a peripheral flange around the edge of said main wall and an outstanding flange from the terminal edge of said peripheral flange, said main wall of said grid fitting between the side and end walls of said casing with said peripheral flange within the casing and said outstanding flange serving as a stop to limit insertion of the grid into the casing, a portion of each end of said grid having an elongated pocket-like depression in the outside of said peripheral flange, corresponding portions of the end walls of said casing having inturned flanges adapted to seat in said pocket-like depressions, said peripheral flange having outwardly projecting portions along the lower edges of said depressions to snap over said inturned flanges and thereby retain said grid in position relative to said casing.

2. In a casing and grid structure, a casing formed of sheet metal with a main wall and a peripheral wall outstanding therefrom, a grid having a main wall, a peripheral flange outstanding therefrom and a flange at the terminal edge of said peripheral flange, said last flange extending in a plane substantially parallel to said main wall of said grid, said last flange serving as a stop to limit insertion of the grid into the casing, portions of said peripheral and stop flanges of said grid being of Z-shaped cross-section to provide pocket-like depressions in the outside of said peripheral flanges, said peripheral wall of said casing having inturned portions adapted to seat therein with the diagonal portion of the Z effecting snap action and biasing said stop flanges to their stop positions after said grid is installed.

EDWARD C. SCHMID.